United States Patent

Simmons et al.

[11] Patent Number: 5,615,467
[45] Date of Patent: Apr. 1, 1997

[54] BROACHING DEVICE AND METHOD

[75] Inventors: Mark J. Simmons, Barnstaple; Steven G. Parsons, Braunton, both of England

[73] Assignee: Thomson Saginaw Ball Screw, Inc., Saginaw, Mich.

[21] Appl. No.: 523,763

[22] Filed: Sep. 5, 1995

[30] Foreign Application Priority Data

Sep. 15, 1994 [GB] United Kingdom ............... 9418602

[51] Int. Cl.$^6$ ..................................................... B23D 37/00
[52] U.S. Cl. ........................... 29/27 C; 409/244; 409/270; 409/276; 409/280; 409/285; 470/106
[58] Field of Search ........................... 409/244, 259, 409/281, 285, 282, 257, 276, 280, 269, 270, 271, 275, 260, 261; 72/454; 29/27 C, 27 R; 470/106

[56] References Cited

U.S. PATENT DOCUMENTS

Re. 15,464  10/1922  Blanchard ........................ 409/275
1,137,218   4/1915   Lapointe ......................... 409/285
1,319,482   10/1919  Mayoh ............................ 409/285
1,406,022   2/1922   Infiorati ........................ 409/285
2,352,873   7/1944   Welte et al. ..................... 409/261
4,000,661   1/1977   Menzel ........................... 74/89.15
5,307,549   5/1994   Tsutsumi et al. .................. 29/27 C

FOREIGN PATENT DOCUMENTS 399670   10/1933  United Kingdom.
1560536  2/1980   United Kingdom.

*Primary Examiner*—M. Rachuba
*Assistant Examiner*—Christopher Kirkman
*Attorney, Agent, or Firm*—Learman & McCulloch

[57] ABSTRACT

A broaching device and method for enlarging an opening, hollow or cavity in a workpiece comprises a broaching tool which is mounted on, or formed on, either the shaft or the nut of a ballscrew drive unit which includes a ballscrew shaft and a ballscrew nut.

20 Claims, 1 Drawing Sheet

BROACHING DEVICE AND METHOD

FIELD OF INVENTION

This invention relates to a broaching device and method, that is to say, a device and method which includes or makes use of a broaching tool by means of which an opening, hollow or cavity in a workpiece can be enlarged.

Typically, conventional broaching mechanisms are powered hydraulically and involve larger, more expensive, less efficiently powered, and more complex equipment with limited mechanical advantage, compared to the system of the present invention.

STATEMENT OF INVENTION

Broadly, a broaching device or method in accordance with the invention comprises or makes use of a ballscrew drive unit having a ballscrew shaft and a ballscrew nut, wherein a broaching tool is mounted on, or formed on, either the shaft or the nut.

The present invention provides virtually unlimited mechanical advantage, which is particularly advantageous when hexagonal holes are being broached, since these cannot be broached with progressive passes and must be taken in one bite into a blind hole. It is ah important object of the invention to provide well controlled, highly mechanically advantaged tool advancement.

In one form of broaching device in accordance with the invention, the ballscrew shaft is mounted on the tailstock of a centre lathe. The broaching tool is connected to, or formed on, the ballscrew nut, while the workpiece is mounted for rotation in or on the centre lathe chuck. The result is that, when the broaching tool engages the rotating workpiece, the nut likewise begins to rotate due to frictional contact between the tool and the workpiece and is thus axially displaced due to its being mounted on the fixed ballscrew shaft. In other words, the broaching tool is made to rotate with the workpiece, with that rotation of the tool serving as a means of driving the tool into the workpiece.

The device has been found particularly useful for forming openings of hexagonal cross-section in the ends of ball screws.

BRIEF DESCRIPTION OF THE DRAWINGS

Two examples of broaching devices and methods in accordance with the invention are shown in the accompanying drawing, in which.

DESCRIPTION OF PREFERRED EMBODIMENTS

Figure 1:
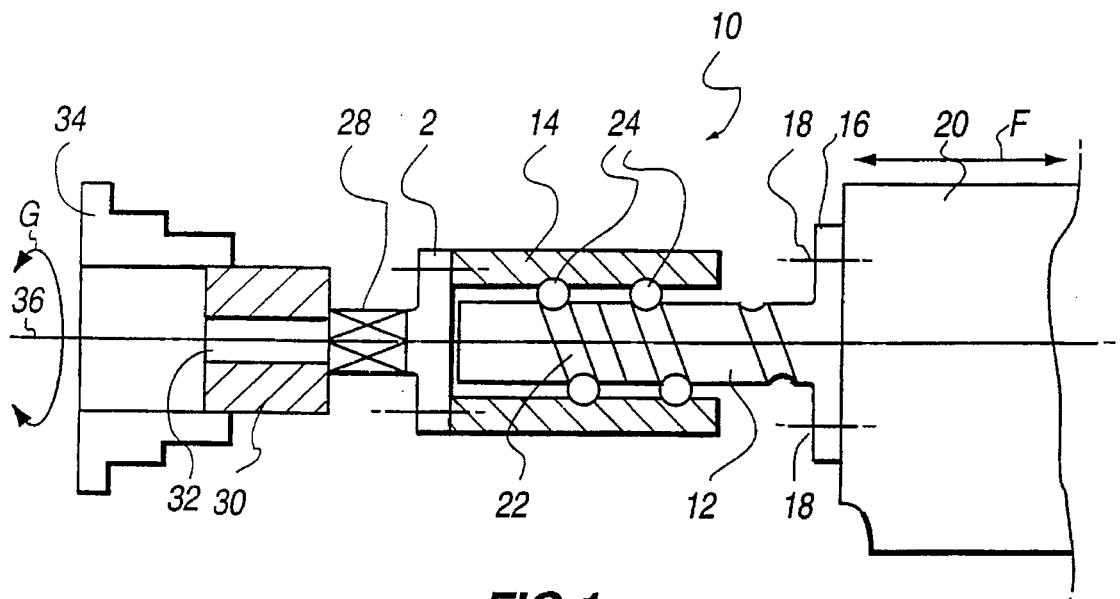
FIG. 1 is an axial section through one form of broaching device mounted on a lathe.

The broaching device shown in FIG. 1 comprises a ballscrew drive unit 10 comprising a ballscrew shaft 12 and, mounted thereon, a ballscrew nut 14. One end of the ballscrew shaft is provided with a flange 16 which is attached by a number of bolts 18 to the tailstock 20 of a centre lathe. As will be seen by the double arrow F, the tailstock is mounted for axial movement on the lathe. As is usual in ballscrew drive units, the ballscrew shaft 12 is provided with a helical groove 22 which accommodates balls 24 in engagement with the ballscrew nut 14. Rotation of the nut on the shaft therefore causes axial movement of the nut.

The end portion 26 of the ballscrew nut 14 supports a broaching tool 28. This can be of conventional design and is shaped, in common with broaching tools generally, to enlarge an opening, hollow or cavity in a workpiece. The tool can be attached as by welding or bolting to the end portion 26 of the ballscrew nut 14 or it can be made integral with that end portion during manufacture.

A workpiece 30 having a centre opening 32 which is to be enlarged by the broaching tool 28 is mounted for rotation on a chuck 34 of the centre lathe. In the machining of many ball screws, the tool 28 is of hexagonal cross-section and the pilot opening 32 in the screw workpiece 30 is configured appropriately. As indicated by the double arrow G, the chuck, and therefore the workpiece, can be rotated in either direction about the longitudinal centre line 36 of the lathe.

Once the workpiece has been set in rotation, the tailstock 20 is moved axially of the lathe so that the tool 28 engages the axially-fixed workpiece. As soon as this happens, the tool will begin to rotate with the axially-fixed workpiece due to the frictional contact between them. The feed of the tail stock is then discontinued with the tail stock effectively axially locked. Because the tool is rigidly mounted on the ballscrew nut 14, the latter is also rotated with the tool and therefore begins to move axially of the ballscrew shaft 12. This causes the broaching tool 28 to bite yet more deeply into the workpiece. The effect is that rotation of the broaching tool because of its frictional contact with the workpiece causes the ballscrew nut 14 to move steadily along the ballscrew shaft 12 until the tool has accomplished the desired enlarging of the opening 32 in the workpiece.

Figure 2:
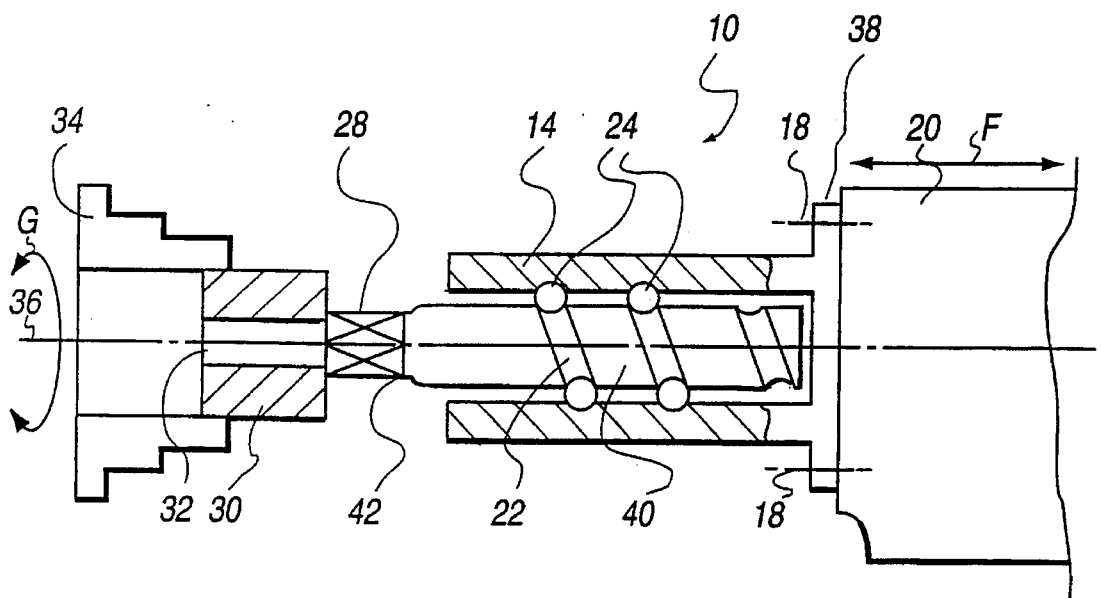
FIG. 2 is a similar section through an alternative form of broaching device.

FIG. 2 illustrates an alternative form of broaching device in which the ballscrew nut 14 is provided with a flange 38 by which it is bolted to the tailstock 20 through the use of a number of bolts 18. The outer end 40 of the ballscrew nut is open so as to permit the ballscrew shaft 12 to move axially back and forth in the ballscrew nut. The outer end 42 of the ballscrew shaft has a broaching tool 28 either attached to it or formed on it.

It will thus be seen that the broaching device shown fin FIG. 2 differs from that shown in FIG. 1 in that the ballscrew nut 14 is held stationary while the ballscrew shaft 12 is free to rotate and to move axially as the broaching tool engages the workpiece 30 and begins to rotate with it. The operation is reversible in that locations of the ball screw/broaching tool can be reversed between the chuck and tail stock.

It is to be understood that the embodiments described are exemplary of various forms of the invention only and that the invention is defined in the appended claims which contemplate various modifications within the spirit and scope of the invention.

We claim:

1. A broaching device for enlarging an opening, hollow or cavity in a workpiece, the device comprising:

a lathe having a tail stock and a workpiece mounting rotary chuck;

a ballscrew shaft mounted on said tailstock having a helical raceway groove formed externally on the shaft;

a ballscrew nut mounted on said ballscrew shaft, the nut being provided with an internally-formed helical raceway groove;

load bearing balls accommodated in said raceway grooves to transfer motion between the shaft and nut;

said shaft being axially stationary and said nut being axially movable with respect to the shaft;

and a broaching tool mounted on the nut so as to be axially movable therewith.

2. A broaching device as claimed in claim 1, wherein one end of the ballscrew shaft is provided with a flange attached by a plurality of bolts to the tailstock of the lathe.

3. A broaching device as claimed in claim 1, wherein the tailstock is mounted for axial movement on the lathe.

4. A broaching device as claimed in claim 1, wherein the broaching tool is attached by welding to an end portion of the ballscrew nut.

5. A broaching device as claimed in claim 1, wherein the broaching tool is connected by a plurality of bolts to an end portion of the ballscrew nut.

6. A broaching device as claimed in claim 1, wherein the broaching tool is formed integrally with an end portion of the ballscrew nut.

7. A broaching device for enlarging an opening, hollow or cavity in a workpiece, the device comprising:

a lathe having a tailstock and a rotary workpiece mounting chuck;

a ballscrew shaft having a helical raceway groove formed externally on the shaft;

a ballscrew nut carried on said tailstock and mounted on said ballscrew shaft, the nut being provided with an internally-formed helical raceway groove;

load bearing balls in said raceway grooves to transfer motion between the nut and shaft;

said nut being axially stationary and said shaft being axially movable with respect to the nut;

and a broaching tool mounted on the shaft so as to be axially movable therewith.

8. A broaching device as claimed in claim 7, wherein one end of the ballscrew nut is provided with a flange attached by a plurality of bolts to the tailstock of the lathe.

9. A broaching device as claimed in claim 7, wherein the tailstock is mounted for axial movement on the lathe.

10. A broaching device as claimed in claim 7, wherein the broaching tool is attached by welding to an end portion of the ballscrew shaft.

11. A broaching device as claimed in claim 7, wherein the broaching tool is connected by a plurality of bolts to an end portion of the ballscrew shaft.

12. A broaching device as claimed in claim 7, wherein the broaching tool is formed integrally with an end portion of the ballscrew shaft.

13. A broaching device for forming openings in workpieces having openings with marginal surfaces to be broached pre-provided therein, the device comprising:

drive transmitting mechanism including a rotary first machine tool part and an axially spaced, axially movable second machine tool part; a screw and nut assembly connected with one of said first and second parts and incorporating a screw mounting a nut; a broaching tool immovably mounted on one of the screw and nut and projecting axially from said assembly; one of said first and second machine tool parts comprising a workpiece holder and the other machine tool part a mount for said screw and nut assembly so that the frictional resistance between said tool and marginal opening surface of a workpiece held in said holder, created by rotation of said first part after said parts are moved axially to engage said workpiece and tool, causes said screw and nut to move relatively axially to relatively axially feed said tool and workpiece marginal surface with mechanical advantage in the broaching operation.

14. The mechanism of claim 13 wherein said workpiece holder is a workpiece holding chuck axially aligned with said tool.

15. The mechanism of claim 14 wherein the screw and nut assembly includes a recirculating raceway including complemental grooves in the screw and nut, and load bearing balls are provided in the raceway.

16. The mechanism of claim 15 wherein the screw and nut assembly is mounted on a lathe tailstock.

17. The mechanism of claim 16 wherein it is the nut which is mounted on the tailstock and the broaching tool is mounted on the screw.

18. The mechanism of claim 16 wherein it is the screw which is mounted on the tailstock and the broaching tool is mounted on the nut.

19. A method of broaching openings in workpieces to a desired size and configuration using a ball screw and nut assembly incorporating a ball screw and nut configured to provide a recirculating raceway between them which includes ball return portions; load bearing balls accommodated in said raceway to transfer motion between the ball screw and nut; a broaching tool of greater lateral extent than said openings being provided on one of the ball screw and nut to project axially from said assembly; and drive transmitting members being provided for moving the workpiece and the ball screw and nut assembly relatively axially and in relative rotation; the steps of:

(a) from a remote position moving the workpiece and the ball nut and screw relatively axially to move the tool into frictional engagement with the surface of one of said openings; and (b) causing the tool and workpiece to be frictionally co-rotate and the tool and workpiece to feed relatively axially to broach the workpiece opening via consequent mechanically advantaged interaction of the ball nut and screw assembly.

20. A method of broaching comprising:

(a) providing axially spaced apart relatively rotatable and relatively axially movable machine tool members;

(b) mounting a workpiece having an opening with marginal surface to be broached on one of said members;

(c) mounting a broaching tool, connected via a nut and screw assembly to the other member, in axial alignment with the workpiece;

(d) relatively rotating said machine tool members;

(e) relatively axially moving the machine tool members to bring the tool and workpiece marginal surface into frictional engagement to cause the workpiece and tool to relatively feed axially as a result of mechanically advantaged interaction between the nut and screw of the nut and screw assembly.

* * * * *